(12) United States Patent
Sezaki et al.

(10) Patent No.: US 6,601,131 B2
(45) Date of Patent: Jul. 29, 2003

(54) FLASH MEMORY ACCESS CONTROL VIA CLOCK AND INTERRUPT MANAGEMENT

(75) Inventors: Toshihiro Sezaki, Tokyo (JP); Katsunobu Hongo, Tokyo (JP); Masato Koura, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 400 days.

(21) Appl. No.: 09/735,621

(22) Filed: Dec. 14, 2000

(65) Prior Publication Data

US 2001/0054128 A1 Dec. 20, 2001

(30) Foreign Application Priority Data

Jun. 8, 2000 (JP) ......................... 2000-171968

(51) Int. Cl.[7] ................... G06F 13/16; G06F 9/312; G06F 13/372
(52) U.S. Cl. .................. 711/103; 710/59; 710/266; 365/185.29; 365/185.33; 365/218; 365/189.07; 713/322; 713/601; 711/166
(58) Field of Search .................. 365/185.29, 185.33, 365/218, 189.07; 710/25, 58, 59, 266; 711/102, 103, 166; 713/2, 322, 323, 502, 600, 601

(56) References Cited

FOREIGN PATENT DOCUMENTS

| JP | 63-206852 | 8/1988 |
| JP | 8-273383 | 10/1996 |
| JP | 10-177563 | 6/1998 |

*Primary Examiner*—B. James Peikari
(74) *Attorney, Agent, or Firm*—Burns, Doane, Swecker & Mathis, LLP

(57) ABSTRACT

A microcomputer with a built-in flash memory includes a flash controller for controlling writing/erasing of the flash memory in accordance with a command from a CPU. The flash controller produces a CPU rewriting mode designating signal and a busy signal during writing/erasing of the flash memory. In response to the two signals, awaiting mode controller implements a waiting mode by outputting a control signal to open and close an AND gate using the control signal, thereby halting a supply of a clock signal to the CPU in the waiting mode. The microcomputer can reduce the load on software for writing/erasing of the flash memory, and the load on developing software.

10 Claims, 7 Drawing Sheets

FLASH MEMORY ACCESS CONTROL VIA CLOCK AND INTERRUPT MANAGEMENT

BACKGROUND OF THE INVENTION

1. Field of the Invention

The present invention relates to a microcomputer with a built in flash memory.

2. Description of Related Art

Recently, flash memories have rapidly come onto the market. This is because, unlike EPROM (Erasable Programmable Read-Only Memory) requiring ultraviolet light for erasing, erasure as well as writing of data can be easily achieved electrically with flash memories, and hence the once written program and data (data and the like) can be easily updated. Thus, the microcomputer with a built-in flash memory using the flash memory in place of a mask ROM or EPROM for storing programs or data has also been rapidly extending its markets.

Just as a single chip flash memory not installed into a microcomputer, the flash memory installed in the microcomputer with a built-in flash memory can be written (programmed) and erased using a flash memory writer. While they are mounted on (soldered, connected to) a circuit board, however, the flash memory in the microcomputer with a built-in flash memory or the single chip flash memory cannot be connected to the flash writer, and hence cannot be written or erased by the flash writer. Thus, a microcomputer with a built-in flash memory with a CPU rewritable function is conceived which carries out writing and erasing by transferring data or the like to the flash memory using the CPU of the microcomputer with a built-in flash memory.

In other words, to solve the foregoing problem, a microcomputer with a built-in flash memory with a CPU rewritable function is proposed which can achieve writing and erasing of the flash memory installed in the microcomputer using the embedded CPU even after mounted on a circuit board.

FIG. 8 is a block diagram showing a configuration of a conventional microcomputer with a built-in flash memory with a CPU rewritable function. In this figure, the reference numeral 1 designates a microcomputer, 2 designates an internal bus, 3 designates a CPU with a BIU (Bus-Interface Unit) incorporating an instruction queue buffer 4 designates a flash memory, 5 designates a flash controller, 6 designates a RAM, 7 designates an input/output terminal, 8 designates a clock generator, 9 designates a monitor timer, 10 designates an interrupt controller, 11 designates an external bus, 12 designates a personal computer (called PC from now on), 13 designates an interface (I/F) and 14 designates an oscillator.

FIG. 7 is a block diagram showing an internal configuration of a flash controller 5 of the conventional and of the present invention microcomputer with a built-in flash memory. In this figure, the reference numeral 30 designates a flash writing/erasing executer, 31 designates a flash command register, 32 designates a flash control register, and 32a designates a busy bit in the flash control register 32.

Next, the operation of the conventional microcomputer will be described.

The monitor timer 9 down-counts the clock signal CLK2 the clock generator 8 generates from the oscillation signal supplied from the oscillator 14, and supplies its underflow signal S1 to the interrupt controller 10. Receiving the underflow signal S1, the interrupt controller 10 issues an interrupt request to the CPU 3 by supplying it with a monitor timer interrupt signal S2. The CPU 3 sets a predetermined value to the monitor timer 9 at every fixed time interval using a setting signal S3 so that if the CPU 3 runs away and the monitor timer 9 is not set within the predetermined time period, the monitor timer 9 underflows and generates the monitor timer interrupt signal S2. Detecting the monitor timer interrupt signal S2, the CPU 3 recognizes its own runaway, and returns to its normal operation by executing the corresponding interrupt service routine.

Next, data writing and erasing of the flash memory 4 using the CPU 3 will be described.

It is assumed here that the data to be written is supplied from the PC 12 to the interface 13, and that a program for carrying out the following operations is stored in a particular area of the flash memory 4 or in the RAM 6, and the CPU 3 operates in accordance with the program. When the flash memory 4 stores the program, it must transfer the program to the RAM 6 in advance to execute the program on the RAM 6. This is because the CPU 3 cannot fetch operation code from the flash memory 4 during writing/erasing of the flash memory 4. The transfer of the program to the RAM 6 can present such problems as occupying a memory area on the RAM 6, taking time for transferring the program, and consuming time to develop software.

In the write operation, the CPU 3 writes "1" into a CPU rewriting mode designating bit in the flash control register 32 in the flash controller 5, first. In response to this, the flash control register 32 supplies the CPU rewriting mode designating signal S4 to the flash writing/erasing executer 30. The flash writing/erasing executer 30 waits for a command to be written in the flash command register 31. Subsequently, when the CPU 3 writes a write command in the flash command register 31, the flash writing/erasing executer 30 decodes the command, and starts a sequence of writing into the flash memory 4. Then, the CPU 3 reads the data to be written through the interface 13, and writes the data into the flash memory 4. Thus, the flash writing/erasing executer 30 executes actual writing of the data to the flash memory 4 in a prescribed sequence.

In the course of writing to the flash memory 4, the flash writing/erasing executer 30 generates a clock signal and counts it to execute the write process step by step at prescribed time independently of the operation of the CPU 3. Since the CPU 3 can read the write busy signal S5 indicating that the write process is being executed through the busy bit 32a in the flash control register 32, the CPU 3 continues reading the busy bit 32a throughout the course, and waits for the busy signal S5 to be disabled, that is, waits for the end of the write operation.

Assuring that the busy signal S5 is disabled, the CPU 3 verifies whether the data is written into the flash memory 4 correctly by a well known, method. When the data is written correctly, the CPU 3 carries out the next data write in the same manner as described above.

As for the erasure of the flash memory 4, the CPU 3 can execute it by setting a CPU rewriting mode into the flash control register 32 in the flash controller 5, and then by writing an erasing command into the flash command register 31.

Decoding the erasing command, the flash writing/erasing executer 30 executes the erasure of the flash memory 4 in accordance with a prescribed sequence. In the course of erasing the flash memory 4, since the busy signal S5 is enabled, the CPU 3 continues reading the busy bit 32a in the flash control register 32 (polling).

Since the writing and erasing time period is much longer than a common operation period of the PC, the monitor timer 9, which is provided for detecting a runaway of the CPU 3, can underflow, thereby causing an undesired monitor timer interrupt. To prevent the undesired monitor timer interrupt, the CPU 3 must generate the setting signal S3 within a predetermined period to reset the value of the monitor timer 9.

As described above, in the microcomputer with a built-in flash memory, the CPU 3 must execute the polling continuously during the writing/erasing of the flash memory 4 to detect its end. In addition, since the monitor timer 9 continues its operation during the rewriting/erasing of the flash memory 4, an instruction for resetting the value of the monitor timer 9 must be inserted in many places of the program to prevent the underflow of the value of the monitor timer 9.

To solve such a problem, Japanese patent application laid-open No. 10-177563/1998, for example, proposes a new microcomputer with a built-in flash memory. This microcomputer with a built-in flash memory keeps a waiting mode during writing/erasing of the flash memory 4, during which it generates a clock stop signal by ANDing the CPU rewriting mode designating signal S4 and the busy signal S5 output from the flash controller 5. The clock stop signal prevents the clock signal CLK1 from being supplied from the clock generator 8 to the CPU 3, halting the operation of the CPU 3. After completing the writing/erasing of the flash memory 4, the microcomputer returns from its waiting mode, and restarts the supply of the clock signal CLK1, thereby restarting the operation of the CPU 3.

When the waiting mode is released without experiencing the interrupt, instructions queuing at the instruction queue buffer installed in the BIU in the CPU 3 are not cleared. In the course of writing/erasing of the flash memory 4, if the instructions are left queuing at the instruction queue buffer in the BIU when the supply of the clock signal CLK1 to the CPU 3, which is halted by the stop signal, is restarted, the CPU 3 can runaway. Accordingly, the instructions queuing at the instruction queue buffer in the BIU must be cleared when the supply of the clock signal CLK1 to the CPU 3 is restarted after completing the writing/erasing of the flash memory 4. In addition, when supply of the clock signal CLK1 is halted or restarted suddenly without adjusting its timing, an abnormal operation can take place.

In summary, the conventional microcomputer with a built-in flash memory with the foregoing configuration has the following problems.

(1) When rewriting the flash memory 4, it is necessary for the CPU 3 to transfer the control program from the flash memory 4 to the RAM 6 in advance so that the control program is executed on the RAM 6. This presents problems of occupying a memory area on the RAM 6 by the control program, wasting time needed for the transfer, and requires much time for software development.

(2) Since the CPU 3 must continuously execute polling to detect the end of writing/erasing of the flash memory 4, an increasing load is imposed on the software.

(3) Since the monitor timer 9 is operating during rewriting/erasing of the flash memory 4, the instruction for setting the monitor timer value must be inserted in many places in the program, increasing the load on software development.

(4) When restarting the supply of the clock signal CLK1 to the CPU 3, instructions queuing at the instruction queue buffer in the BIU must be cleared each.

(5) If the supply of the clock signal CLK1 is halted or restarted suddenly, an abnormal operation can take place.

SUMMARY OF THE INVENTION

The present invention is implemented to solve the foregoing problems. It is therefore an object of the present invention to provide a microcomputer with a built-in flash memory capable of reducing a software load in writing/erasing of the flash memory, with lightening a load for developing software.

According to one aspect of the present invention, there is provided a microcomputer with a built-in flash memory comprising: a flash memory for electrically writing or erasing data; a CPU for issuing a writing/erasing command to the flash memory; a monitor timer for producing a time-up signal when the CPU does not set the monitor timer within a predetermined time period; a clock generator for generating a clock signal for operating the CPU; a first interrupt controller for generating a monitor interrupt to the, CPU when the monitor timer outputs the time-up signal; a flash controller for controlling writing/erasing of the flash memory in accordance with the command from the CPU; a waiting mode controller for implementing a waiting mode in response to a CPU rewriting mode designating signal and a busy signal which are output from the flash controller during writing/erasing of the flash memory; and a gate circuit for halting supply of the clock signal from the clock generator to the CPU in the waiting mode in response to a control signal supplied from the waiting mode controller.

Here, the microcomputer with a built-in flash memory may further comprise a particular bit for specifying whether to halt the supply of the clock signal to the CPU, wherein the waiting mode controller implements the waiting mode in response to a value of the particular bit, the CPU rewriting mode designating signal and the busy signal.

The microcomputer with a built-in flash memory may further comprise a one-shot pulse generator for generating a one-shot pulse in response to a change of the busy signal output from the flash controller at an end of writing/erasing of the flash memory; and a second interrupt controller for generating an interrupt signal for releasing the waiting mode in response to the one-shot pulse from the one-shot pulse generator, and for causing an interrupt to the waiting mode controller using the interrupt signal.

The microcomputer with a built-in flash memory may further comprise a changeover switch for switching between the one-shot pulse fed from the one-shot pulse generator and the time-up signal fed from the monitor timer, wherein the first interrupt controller and the second interrupt controller consist of a single common interrupt controller, and wherein the changeover switch supplies its output signal to the common interrupt controller.

The microcomputer with a built-in flash memory may further comprise a logical circuit for generating, from the value of the particular bit and the CPU rewriting mode designating signal, a continuously setting signal that continuously sets the monitor timer when a CPU halting mode is selected in flash memory rewriting operation, and supplies the continuously setting signal to the monitor timer.

The flash controller may comprise a CPU readable flash control register including a particular bit for holding, at an end of writing/erasing of the flash memory, a test resultant signal indicating whether writing/erasing of the flash memory completes normally or abnormally.

DETAILED DESCRIPTION OF THE PREFERRED EMBODIMENTS

The invention will now be described with reference to the accompanying drawings.

EMBODIMENT 1

Figure 1:
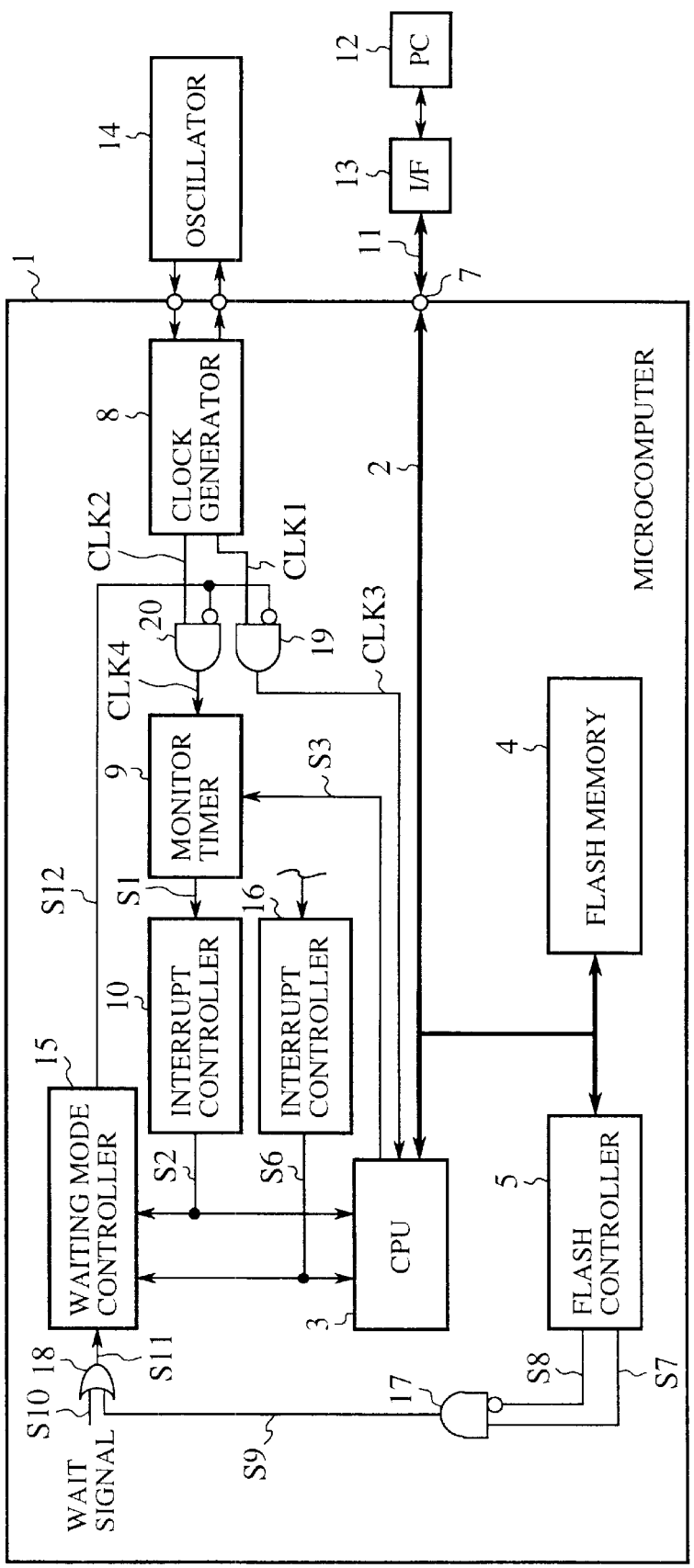
FIG. 1 is a block diagram showing a configuration of an embodiment 1 of a microcomputer with a built-in flash memory in accordance with the present invention.

FIG. 1 is a block diagram showing a configuration of an embodiment 1 of a microcomputer with a built-in flash memory in accordance with the present invention. In this figure, the reference numeral 1 designates a main body of the microcomputer with a built-in flash memory, and 2 designates an internal bus of the microcomputer 1. The reference numeral 3 designates a CPU which is connected to the internal bus 2 for carrying out overall control of the microcomputer 1, and includes a BIU with an instruction queue buffer for fetching and storing its instructions. The reference numeral 4 designates a flash memory connected to the internal bus 2, and 5 designates a flash controller connected to the internal bus 2 for controlling writing/erasing of the flash memory 4. The reference numeral 7 designates an input/output terminal as an interface between the internal bus 2 and the outside. In FIG. 1, an input/output circuit is not shown.

Figure 8:
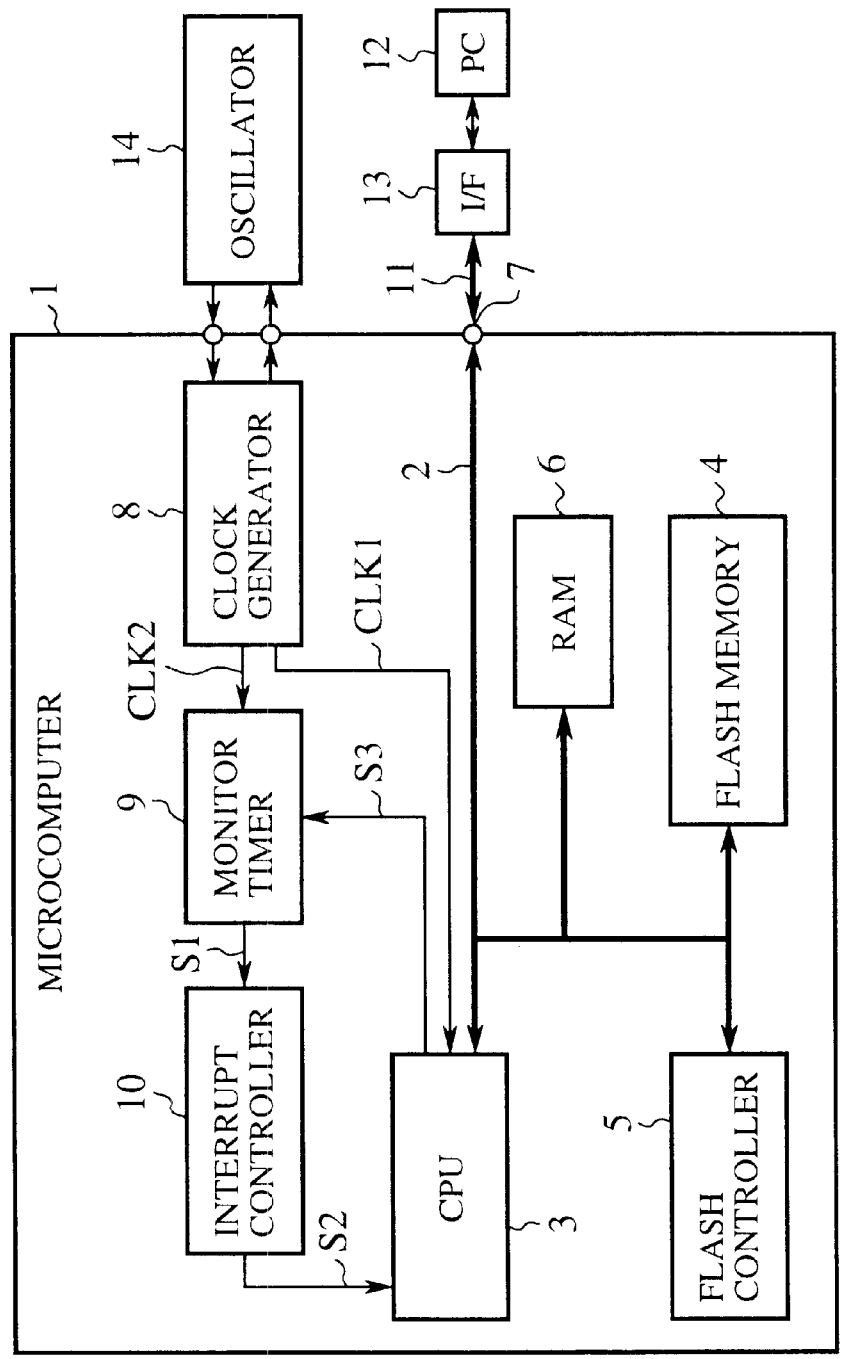
FIG. 8 is a block diagram showing a configuration of a conventional microcomputer with a built-in flash memory.

The reference numeral 8 designates a clock generator for generating clock signals CLK1 and CLK2 in the microcomputer 1. The reference numeral 9 designates a monitor timer for monitoring a runaway of the CPU 3 by counting the clock signal CLK2 fed from the clock generator 8; and 10 designates an interrupt controller for generating a monitor interrupt to the CPU 3 and a waiting mode controller which will be described below, in response to the monitoring result of the monitor timer 9. The reference numeral 11 designates an external bus connected to the internal bus 2 via the input/output terminal 7; 12 designates a PC for supplying the flash memory 4 with data or the like to be written; and 13 designates an interface between the PC 12 and external bus 11. The reference numeral 14 designates an oscillator such as a ceramic or crystal oscillator connected to the clock generator 8 for supplying an oscillation signal to be used for generating the clock signals CLK1 and CLK2. These components are the same as those of the conventional microcomputer shown in FIG. 8 by the same reference numerals.

The reference numeral 15 designates the waiting mode controller for controlling a waiting (WAIT) state of writing/erasing of the flash memory 4. The waiting mode controller 15 is generally installed in a common microcomputer. The reference numeral 16 designates an interrupt controller for controlling interrupts other than from the monitor timer 9. Although there are multiple such circuits, they are designated as the interrupt controller 16 in FIG. 1. The waiting mode controller 15 and CPU 3 are each supplied with the monitor timer interrupt signal S2 from the interrupt controller 10 and the interrupt signal S6 from the interrupt controller 16. The reference numeral 17 designates an AND gate for ANDing a CPU rewriting mode designating signal S7 and an inverted busy signal S8 supplied from the flash controller 5 to generate a clock stop signal S9; 18 designates an OR gate for ORing the clock stop signal S9 supplied from the AND gate 17 and a WAIT signal S10 generated when the WAIT instruction is executed, thereby supplying its output signal S11 to the waiting mode controller 15.

The reference numeral 19 designates an AND gate which is controlled by an inverted control signal S12 output from the waiting mode controller 15 in the waiting mode, and turns on and off the supply of the clock signal CLK1 from the clock generator 8 to the CPU 3. Likewise the reference numeral 20 designates an AND gate which is controlled by an inverted control signal S12 output from the waiting mode controller 15 in the waiting mode, and turns on and off the supply of the clock signal CLK2 from the clock generator 8 to the monitor timer 9. In this case, the CPU 3 receives a clock signal CLK3 produced by the AND gate 19 by turning on and off the clock signal CLK1, and the monitor timer 9 receives a clock signal CLK4 produced by the AND gate 20 by turning on and off the clock signal CLK2.

Figure 7:
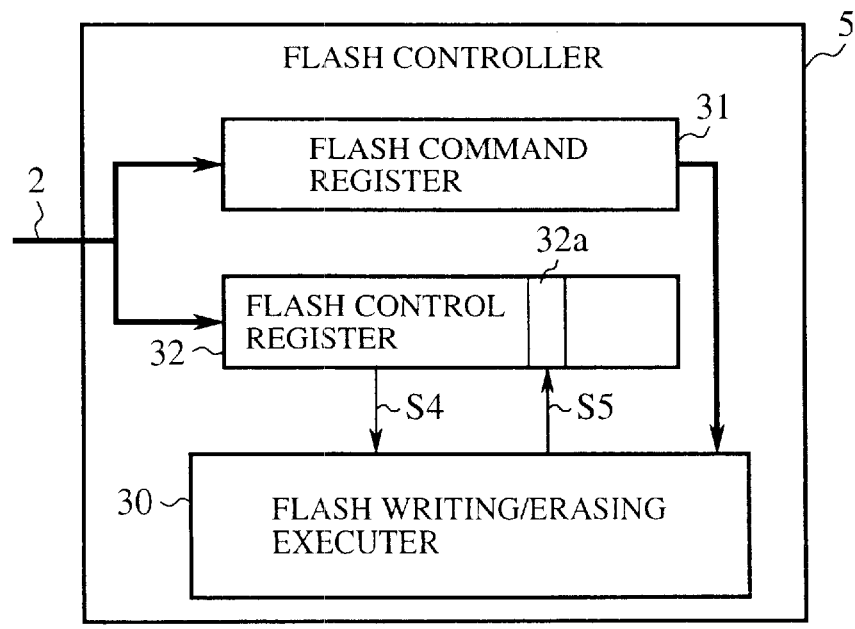
FIG. 7 is a block diagram showing an internal configuration of a flash controller in the embodiment 1 and in a conventional microcomputer with a built-in flash memory.

FIG. 7 is a block diagram showing an internal configuration of the flash controller 5 employed by the microcomputer with a built-in flash memory in accordance with the present invention, which is the same as that of the conventional microcomputer. In FIG. 7, the reference numeral 30 designates a flash writing/erasing executer for carrying out writing and erasing of the flash memory 4. The reference numeral 31 designates a flash command register for receiving a command from the CPU 3; and 32 designates a flash control register for holding control data transferred to and from the CPU 3. The reference numeral 32a designates a busy bit in the flash control register 32 for holding a busy signal indicating that the writing/erasing processing is being performed. The CPU rewriting mode designating signal S7 to be supplied to the AND gate 17 is written into a bit of the flash control register 32 for designating the CPU rewriting mode, and the busy signal S8 is held in the busy bit 32a.

Next, the operation of the present embodiment 1 will be described.

The clock generator 8 generates from the oscillation signal of the oscillator 14 the clock signal CLK1 for the CPU 3, the clock signal CLK2 for the monitor timer 9 and clock signals for peripheral devices not shown. The clock signal CLK1 generated by the clock generator 8 is turned on and off by the AND gate 19 to be supplied to the CPU 3 as the clock signal CLK3. Likewise, the clock signal CLK2 is turned on and off by the AND gate 20 to be supplied to the monitor timer 9 as the clock signal CLK4. In this case, since the control signal S12 from the waiting mode controller 15 is "0" except for the waiting mode, the CPU 3 receives the clock signal CLK1 as the clock signal CLK3, and the monitor timer 9 receives the clock signal CLK2 as the clock signal CLK4.

The monitor timer 9 down-counts the clock signal CLK4, and supplies an underflow signal S1 as a time-up signal to the interrupt controller 10. Receiving the underflow signal S1, the interrupt controller 10 supplies the CPU 3 and waiting mode controller 15 with the monitor timer interrupt signal S2 to cause an interrupt request. Incidentally, the monitor timer 9 can up-count the clock signal CLK4. In this case, the monitor timer 9 supplies its overflow signal to the interrupt controller 10 as a time-up signal, and the interrupt controller 10 supplies the CPU 3 and waiting mode controller 15 with the monitor timer interrupt signal S2. In the present embodiment 1, the monitor timer 9 is assumed to down-count the clock signal CLK4.

The CPU 3 generates a setting signal S3 at every fixed time interval to repeatedly set the value of the monitor timer 9. When the CPU 3 sets the value of the monitor timer 9 within a predetermined time period in this way, the interrupt controller 10 does not generate the monitor timer interrupt signal S2. On the contrary, if the CPU 3 does not set the value of the monitor timer 9 within the predetermined time period because of a runaway, the interrupt controller 10 generates the monitor timer interrupt signal S2, so that the CPU 3 recognizes its runaway by detecting the signal S2. As a result, the CPU 3 carries out the interrupt service routine associated with the monitor timer interrupt signal S2 to return to the normal operation.

Next, the operation of erasing and writing of data on the flash memory 4 using the CPU 3 will be described. It is assumed here that the data to be written is supplied from the PC 12 to the interface 13, and that a control program for carrying out writing/erasing of the flash memory 4 is stored in an area of the flash memory 4. The CPU 3 executes its process in accordance with the control program on the flash memory 4.

In the write operation, the CPU 3 sets a flag on the CPU rewriting mode designating bit in the flash control register 32 installed in the flash controller 5 through the internal bus 2 (write "1", for example). Thus, the CPU rewriting mode designating signal S4 is supplied from the flash control register 32 to the flash writing/erasing executer 30 so that it waits for a command to be written in the flash command register 31. When the CPU 3 writes a write command in the flash command register 31 through the internal bus 2, the flash writing/erasing executer decodes the command, and starts a sequence for carrying out writing to the flash memory 4. The CPU 3 reads the data or the like to be written from the interface 13, and writes the data into the flash memory 4. Thus, the flash writing/erasing executer 30 carries out the actual writing to the flash memory 4 in the predetermined sequence.

In performing the sequence, the flash writing/erasing executer 30 generates a clock signal using its own ring oscillator, clock generator and sequencer (which are not shown), and carries out the write process step by step in accordance with the predetermined timing by counting the clock signal. This processing is executed independently of the operation of the CPU 3. The CPU 3 can read the write busy signal S5 indicating that the write process is being executed (enabled when "0" and disabled when "1", for example) through the busy bit 32a in the flash control register 32. Thus, the CPU 3 continues polling during the writing to read the busy bit 32a, and waits for the busy signal S5 to be disabled at the end of the writing of the flash memory 4.

Confirming that the busy signal S5 is disabled, the CPU 3 verifies whether the data is written correctly into the flash memory 4. Although various well-known methods can be used to achieve this such as reading directly from the flash memory 4 or writing a write-compare command to the flash command register 31, their details will be omitted here because the methods have no direct bearing on the present invention. When it is verified that the data is correctly written, the CPU 3 carries out the next data write (issuing a write command, reading and writing data) in the same manner.

Erasing of the flash memory 4 can be executed in a similar manner. The CPU 3 designates the CPU rewriting mode in the flash control register 32 in the flash controller 5, and writes an erasing command to the flash command register 31 to perform erasing.

Decoding the erasing command, the flash writing/erasing executer 30 executes erasure of the flash memory 4 in accordance with a prescribed sequence. In the course of erasing the flash memory 4, since the busy signal S5 indicating that writing or erasing is being carried out is enabled and output, the CPU 3 continues polling to read the busy bit 32a in the flash control register 32.

Since the writing and erasing time period of the flash memory 4 is much longer than the normal operation period of the PC, the monitor timer 9, which is originally provided for detecting the runaway of the CPU 3, can cause the underflow, generating an undesired monitor timer interrupt. To prevent the undesired monitor timer interrupt, it is necessary for the CPU 3 to generate the setting signal S3 within a predetermined period to set the value of the monitor timer 9.

Next, the operation in the waiting mode will be described.

The waiting mode operation is achieved by executing the WAIT instruction. The state of the CPU 3 in the waiting mode is as follows. The supply of the clock signal CLK3 to the CPU 3 and BIU installed in the CPU 3 is halted. Likewise, the supply of the clock signal CLK4 to the monitor timer 9 is halted. However, as for some functions, the clock supply or halting is selectable. The waiting mode is released by a particular interrupt signal, in which case, the contents of the instruction queue buffer in the BIU installed in the CPU 3 are cleared.

In the CPU rewriting mode, the CPU rewriting mode designating signal S7 and busy signal S8 output from the flash controller 5 become "1" and "0", respectively, during writing/erasing of the flash memory 4. Accordingly, the clock stop signal S9 output from the AND gate 17, which takes logical AND between the CPU rewriting mode designating signal S7 and the inverted busy signal S8, becomes "1". In response to this, the output signal S11 of the OR gate 18 becomes "1". Receiving the output signal S11 of the OR gate 18, the waiting mode controller 15 places the control signal S12 at "1" to bring the microcomputer into a waiting state. In this case, the WAIT signal S10 supplied to the other input terminal of the OR gate 18 is "0".

In response to the control signal S12 of "1", the AND gates 19 and 20 are turned off (closed), halting the supply of the clock signal CLK3 to the CPU 3 and the clock signal CLK4 to the monitor timer 9. This will place the clock terminals of the CPU 3 and monitor timer 9 at "0", and halt the operation of the CPU 3 and monitor timer 9, bringing about the waiting state. The description of the clock supply to the peripheral circuits will be omitted here because it has no direct bearing on the present invention.

The waiting state is released by a prescribed interrupt request signal for releasing the waiting mode. In response to the release of the waiting mode in response to the interrupt request signal, the waiting mode controller 15 places the control signal S12 at "0". The signal S12 causes the AND gates 19 and to be turned on (opened), restarting the supply of the clock signals CLK3 and CLK4 to the CPU 3 and monitor timer 9. When the supply of the clock signal CLK3 to the CPU 3 is restarted, the instructions queuing at the instruction queue buffer in the BIU installed in the CPU 3 are all cleared. This will prevent the runaway of the CPU 3 at the release of the waiting mode. Furthermore, halting the CPU 3 during writing/erasing of the flash memory 4 can prevent the CPU 3 from fetching operation code from the flash memory. This obviates the need for transferring the flash rewrite program to the RAM or the like as in the conventional microcomputer with a built-in flash memory.

Since the waiting mode controller 15 generates the control signal S12 for turning on and off the clock signals CLK1 and CLK2 in response to the output signal S11 of the OR gate 18, the clock stop signal S9 output from the AND gate 17 and the WAIT signal S10 based on the WAIT instruction have the same effect on the transition to and from the waiting mode. Accordingly, the timing of halting/restarting the clock signals when the clock stop signal S9 is supplied to the waiting mode controller 15 is controlled in just the same manner as when the WAIT signal S10 is input. This makes it possible to prevent the halting/restart of the supply of the clock signals from taking place suddenly.

As described above, the present embodiment 1 offers the following advantages.

(1) Additional hardware can be minimized because the RAM area for rewriting the flash memory 4 is unnecessary, and the interrupt controllers 10 and 16 and the waiting mode controller 15 are usually installed already in the microcomputer.

(2) The load on the software is reduced because the transfer of the rewriting program of the flash memory 4 to the RAM area is not required, and the program for setting the monitor timer 9 is unnecessary because the monitor timer 9 is halted in the waiting mode.

(3) Since the waiting mode is released by the interrupt signal, the contents in the instruction queue buffer are cleared at the time of restarting the supply of the clock signal CLK3 to the CPU 3, making it possible to prevent the runaway of the CPU.

(4) Abnormal operations can also be prevented because the sudden halting/restarting of the clock supply does not take place.

(5) The power consumption can be reduced because the CPU is halted in the waiting mode.

EMBODIMENT 2

Figure 2:
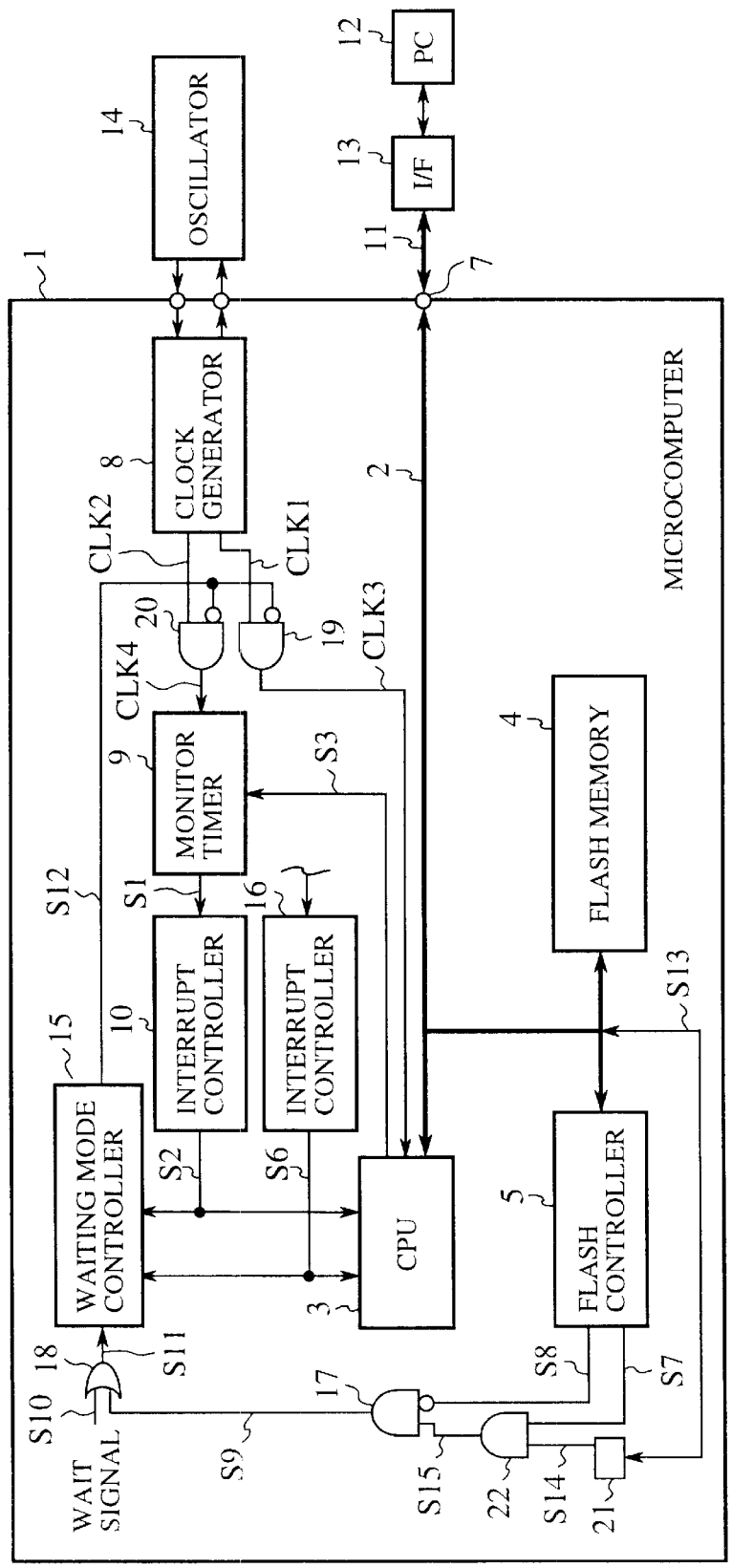
FIG. 2 is a block diagram showing a configuration of an embodiment 2 of the microcomputer with a built-in flash memory in accordance with the present invention.

Next, an embodiment 2 in accordance with the present invention will be described. FIG. 2 is a block diagram showing a configuration of the embodiment 2 of the microcomputer with a built-in flash memory in accordance with the present invention.

In this figure, portions corresponding to those of FIG. 1 of the embodiment 1 are designated by the same reference numerals, and the description thereof is omitted here.

In FIG. 2, the reference numeral 21 designates a CPU rewriting mode select bit for storing a CPU halting mode select signal S13, a particular bit signal on the internal bus 2. The reference numeral 22 designates an AND gate for ANDing the bit signal S14 fed from the CPU rewriting mode select bit 21 and the CPU rewriting mode designating signal S7 fed from the flash controller 5, and supplies its output signal S15 to the AND gate 17. The CPU halting mode select signal S13 is specified by a user in the software, and is identical to the bit signal S14 output from the CPU rewriting mode select bit 21. When the bit signal S14 is "0", the supply of the clock signal CLK3 to the CPU 3 is not halted, whereas when it is "1", the supply is halted.

Thus, the present embodiment 2 of the microcomputer with a built-in flash memory differs from the embodiment 1 as shown in FIG. 1 in that the AND gate 17 takes a logical AND between the output signal S15 from the AND gate 22 and the inverted busy signal S8 fed from the flash controller 5 in place of the logical AND between the CPU rewriting mode designating signal S7 from the flash controller 5 and the inverted busy signal S8.

Next, the operation of the present embodiment 2 will be described.

Since the basic operation is the same as that of the embodiment 1, only different portions will be described here. Although the embodiment 1 is brought into the waiting state without exception during the flash memory writing/erasing operation, the present embodiment 2 can select whether to halt the CPU 3 or not during the flash memory writing/erasing operation using the CPU rewriting mode select bit 21.

When the bit signal S14 held in the CPU rewriting mode select bit 21 is "0", the output signal S15 of the AND gate 22 is always "0". Accordingly, the clock stop signal S9 output from the AND gate 17 is fixed to "0" during the flash memory writing/erasing operation, which enables the supply of the clock signal CLK3, allowing the CPU 3 to continue its operation. Thus, the rewriting of the flash memory is carried out in the same way as in the conventional microcomputer with a built-in flash memory.

In contrast, when the-bit signal S14 held in the CPU rewriting mode select bit 21 is "1", the output signal S15 of the AND gate 22 is "1". Accordingly, the clock stop signal S9 output from the AND gate 17 is fixed to "1" during the flash memory writing/erasing operation, and stops the supply of the clock signal CLK3, halting the operation of the CPU 3. Thus, the rewriting operation of the flash memory is the same as in the foregoing embodiment 1. In this way, the CPU halting modes in both the conventional microcomputer with a built-in flash memory and in the embodiment 1 are preserved, so that two flash memory rewriting modes can be implemented in a single chip.

As described above, the present embodiment 2 offers an advantage of enabling a user to select the mode in response to system conditions such as the CPU halting mode (embodiment 1 mode) or the CPU non-halting mode (conventional mode). The former mode is selected when a RAM has no available area, whereas the latter mode is selected when the user wishes to execute other processes during the rewriting operation of the flash memory.

EMBODIMENT 3

Figure 3:
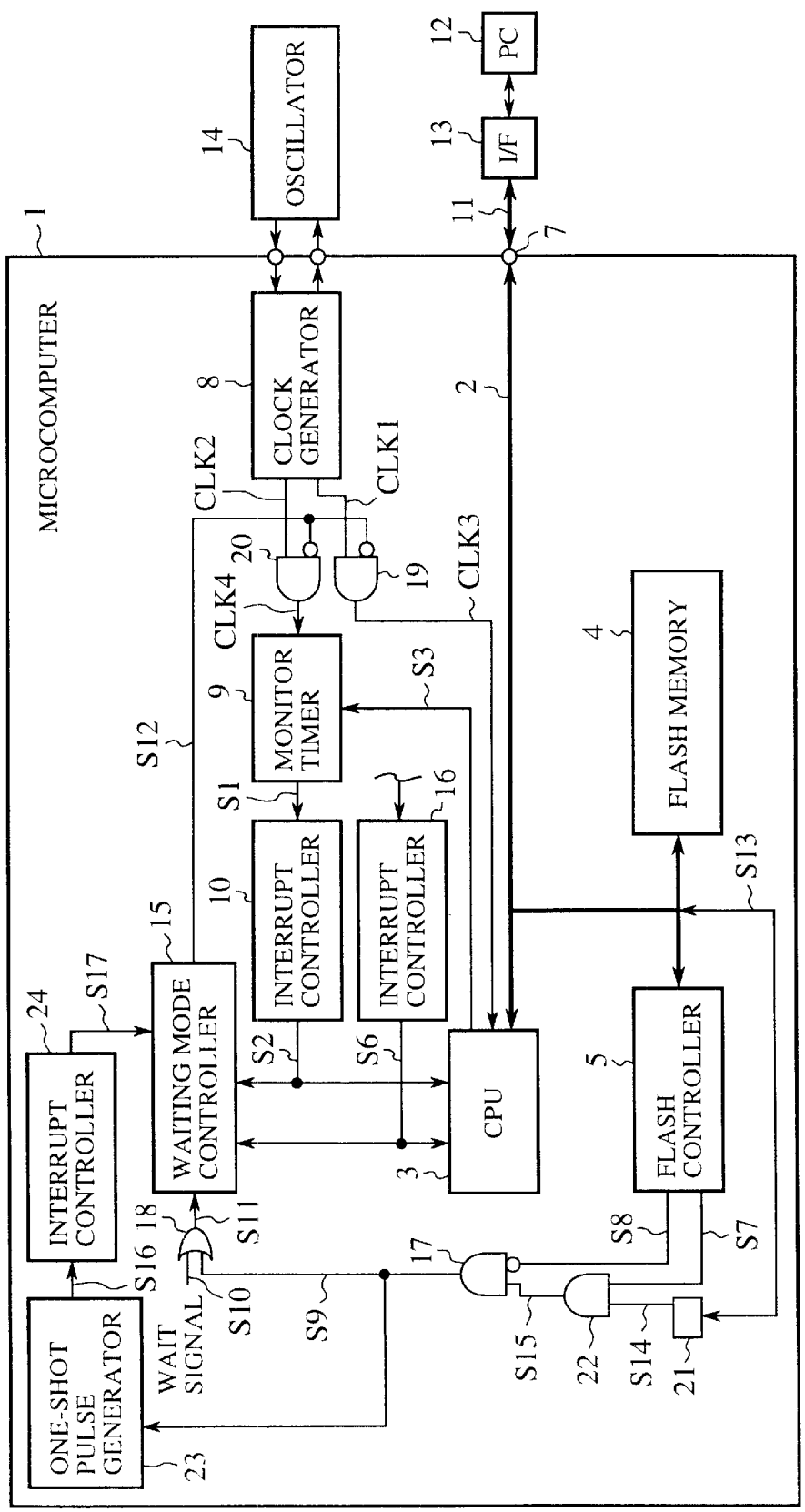
FIG. 3 is a block diagram showing a configuration of an embodiment 3 of the microcomputer with a built-in flash memory in accordance with the present invention.

Next, an embodiment 3 in accordance with the present invention will be described. FIG. 3 is a block diagram showing a configuration of the embodiment 3 of the microcomputer with a built-in flash memory in accordance with the present invention. In this figure, portions corresponding to those of FIG. 2 of the embodiment 2 are designated by the same reference numerals, and the description thereof is omitted here.

In FIG. 3, the reference numeral 23 designates a one-shot pulse generator for generating a one-shot pulse S16 in response to the clock stop signal S9 output from the AND gate 17. The clock stop signal S9 varies in response to the busy signal S8 fed from the flash controller 5 at the end of writing/erasing of the flash memory. The reference numeral 24 designates an interrupt controller for generating an interrupt to the waiting mode controller 15 by using an interrupt signal S17 which is generated in response to the one-shot pulse S16 fed from the one-shot pulse generator 23 to release the waiting mode. The present embodiment 3 differs from the embodiment 2 in that is comprises the one-shot pulse generator 23, and the interrupt controller 24 connected to the waiting mode controller 15.

Next, the operation of the present embodiment 3 will be described.

Since the basic operation of the present embodiment 3 is the same as that of the embodiment 1, only different portions will be described here. The clock stop signal S9 output from the AND gate 17 is supplied to the one-shot pulse generator 23. The clock stop signal S9 is the logical AND between the output signal S15 of the AND gate 22 and the inverted busy signal S8 from the flash controller 5. Here, the signal S15 is the logical AND between the bit signal S14 obtained from the CPU rewriting mode select bit 21 and the CPU rewriting mode designating signal S7 output from the flash controller 5 during writing/erasing of the flash memory. Receiving the clock stop signal S9, the one-shot pulse generator 23 generates the one-shot pulse S16 at the end of writing/erasing of the flash memory.

More specifically, in the CPU halting mode in the CPU rewriting mode, the output signal S15 of the AND gate 22 is "1". On the other hand, the busy signal S8 fed from the flash controller 5 becomes "1" at the end of writing/erasing of the flash memory, though it is "0" during the flash memory writing/erasing operation. Thus, when writing/erasing of the flash memory completes, the clock stop signal S9 output from the AND gate 17 changes from "1" to "0". The one-shot pulse generator 23 the clock stop signal S9.

The one-shot pulse generator 23 supplies the one-shot pulse S16 to the interrupt controller 24 which generates the interrupt signal S17 from the one-shot pulse S16 and supplies it to the waiting mode controller 15. Receiving the interrupt signal S17, the waiting mode controller 15 releases the waiting mode to return the CPU to the operation mode. Since the interrupt is used to release the waiting mode, the instructions queuing at the instruction queue buffer in the BIU are all cleared.

As described above, the present embodiment 3 offers advantages of being able to obviating the polling in which the CPU 3 must continue reading the busy bit 32a from the flash control register 32, to automatically return the CPU 3 to the operation mode at the end of writing/erasing of the flash memory, and to prevent the runaway of the CPU 3 after releasing the waiting mode because of clearing all the contents in the instruction queue buffer in the BIU.

EMBODIMENT 4

Figure 4:
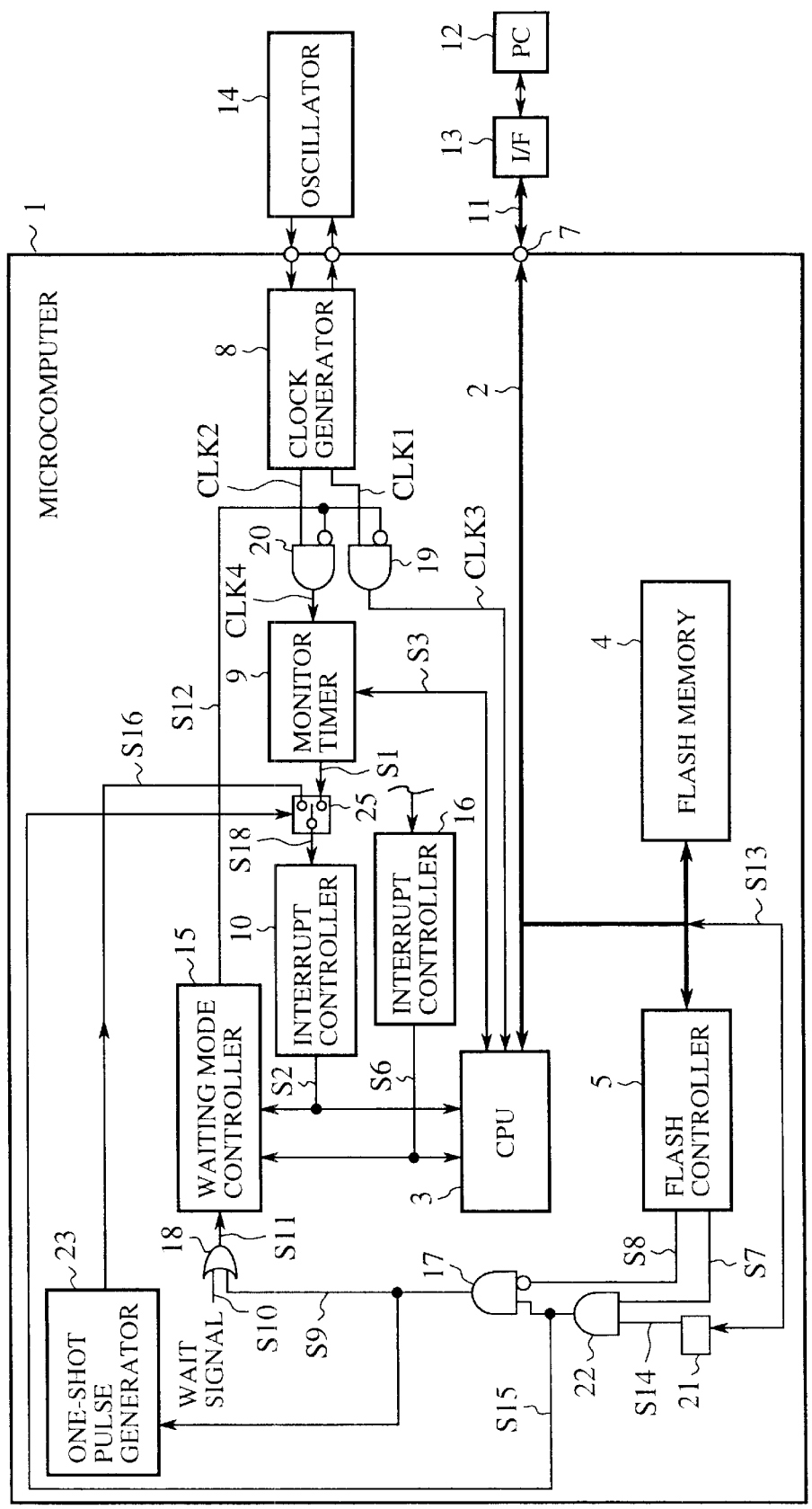
FIG. 4 is a block diagram showing a configuration of an embodiment 4 of the microcomputer with a built-in flash memory in accordance with the present invention.

Next, an embodiment 4 in accordance with the present invention will be described. FIG. 4 is a block diagram showing a configuration of the embodiment 4 of the microcomputer with a built-in flash memory in accordance with the present invention. In this figure, components corresponding to those of the foregoing embodiment 3 are designated by the same reference numerals, and the description thereof is omitted here.

In FIG. 4, the reference numeral 25 designates a changeover switch for switching between the underflow signal S1 and the one-shot pulse S16, and supplies its output signal S18 to the interrupt controller 10. Here, the underflow signal S1 is output from the monitor timer 9 as a time-up signal and the one-shot pulse S16 is output from the one-shot pulse generator 23. The changeover switch 25 is controlled by the output signal S15 of the AND gate 22 that ANDs the bit signal S14 obtained from the CPU rewriting mode select bit 21 and the CPU rewriting mode designating signal S7 output from the flash controller 5. The present embodiment 3 differs from the foregoing embodiment 3 in that it comprises the changeover switch 25 to have the interrupt controller 10 for the monitor timer 9 share the function of the interrupt controller 24 for the waiting mode controller 15.

Next, the operation of the present embodiment 4 will be described.

Since the basic operation of the present embodiment 4 is the same as that of the embodiment 1, only different portions will be described here. The interrupt controller 10, which is originally provided for generating an interrupt to the CPU 3 and waiting mode controller 15 using the underflow signal S1 output from the monitor timer 9, shares the function of the interrupt controller 24 used in the embodiment 3 to release the waiting state. To achieve this, the changeover switch 25 makes a changeover between the one-shot pulse S16 fed from the one-shot pulse generator 23 and the underflow signal S1 fed from the monitor timer 9, and supplies its output to the interrupt controller 10. Specifically, the changeover switch 25 selects the one-shot pulse S16 when the output signal S15 of the AND gate 22 is "1", and selects the time-up signal output from the monitor timer 9 when it is "0", and supplies the output signal S18 to the interrupt controller 10.

When the CPU halting mode is selected during the flash memory writing/erasing operation, the output signal S15 of the AND gate 22 is "1". Therefore, the, changeover switch 25 selects the one-shot pulse S16 generated by the one-shot pulse generator 23 in response to the output signal S15, and supplies it to the interrupt controller 10 as the output signal S18, followed by the same operation as that of the embodiment 3. In this case, since the underflow signal S1 from the monitor timer 9 is disconnected from the interrupt controller 10 by the changeover switch 25, the interrupt by the monitor timer 9 will be canceled. Before that, the monitor timer 9 is halted because the supply of the clock signal CLK4 to the monitor timer 9 is stopped.

In contrast, when the CPU halting mode is released during the flash memory writing/erasing operation, the output signal S15 of the AND gate 22 changes to "0". Accordingly, the changeover switch 25 selects the underflow signal S1 from the monitor timer 9, and supplies it to the interrupt controller 10 as the switched output signal S18, followed by the same operation as that of the embodiment 1. In this case, since the one-shot pulse S16 from the one-shot pulse generator 23 is disconnected from all the other components by the changeover switch 25, the interrupt caused by the one-shot pulse generator 23 is invalid.

As described above, according to the present embodiment 4 the interrupt controller 10 shares the function of the interrupt controller 24, offering an advantage of being able to minimize the amount of additional hardware.

EMBODIMENT 5

Figure 5:
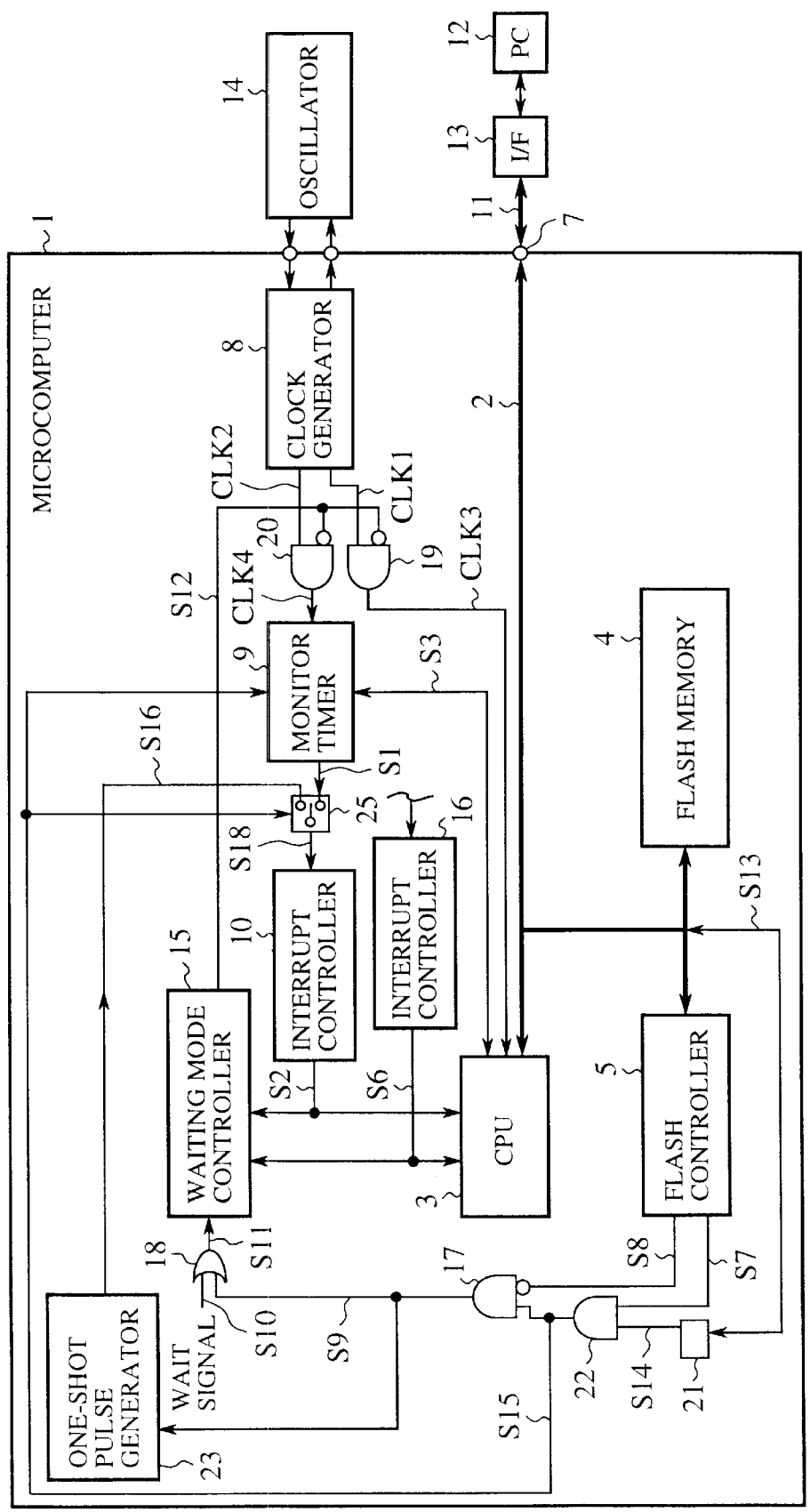
FIG. 5 is a block diagram showing a configuration of an embodiment 5 of the microcomputer with a built-in flash memory in accordance with the present invention.

Next, an embodiment 5 in accordance with the present invention will be described. FIG. 5 is a block diagram showing a configuration of the embodiment 5 of the microcomputer with a built-in flash memory in accordance with the present invention. In this figure, components corresponding to those of the foregoing embodiment 4 are designated by the same reference numerals, and the description thereof is omitted here. The present embodiment 5 differs from the embodiment 4 in that the output signal S15 of the AND gate 22 is also supplied to the monitor timer 9, so that it functions as a continuously setting signal to continuously setting the monitor timer 9 when the CPU halting mode is selected during the flash memory writing/erasing operation.

Next, the operation, of the present embodiment 5 will be described.

Since the basic operation of the embodiment 5 is the same as that of the embodiment 1, only different portions will be described here. When the value of the monitor timer 9 is intermittently reset at every predetermined time interval using software in the CPU halting mode during writing/erasing of the flash memory, an undesired monitor timer interrupt can occur at the time of releasing the CPU halting mode. This is because when the CPU halting mode is released, the changeover switch 25 can select the underflow signal S1 from the monitor timer 9, and supply it to the interrupt controller 10 as the output signal S18. To prevent this problem in the present embodiment 5, the output signal S15 of the AND gate 22 is supplied to the monitor timer 9 as the continuously setting signal to continuously set the value of the monitor timer 9 when the CPU halting mode is selected.

Thus, the output signal S15 of the AND gate 22, which is used as the switching control signal of the changeover switch 25 in the embodiment 4, is also supplied to the monitor timer 9 as the continuously setting signal. The output signal S15 of the AND gate 22 is "1" when the CPU halting mode is selected in rewriting the flash memory. Accordingly, the changeover switch 25 controlled by the output signal S15 selects the one-shot pulse S16 from the one-shot pulse generator 23, and supplies it to the interrupt controller 10 as the switched output signal S18. In the course of this, the output signal S15 of the AND gate 22, which is also supplied to the monitor timer 9, continuously sets the monitor timer 9 throughout in which the output signal S15 fed from the AND gate 22 is "1".

When the CPU halting mode is released in the flash memory rewriting mode, the output signal S15 of the AND gate 22 changes to "0" so that the underflow signal S1 from the monitor timer 9 is supplied to the interrupt controller 10 as the switch output signal S18. In this case, although the monitor timer 9 is supplied with the output signal S15 of the AND gate 22, it is not set by the signal S15 because its value is "0", but is set by he setting signal S3 from the CPU 3.

Thus, when the CPU halting mode is selected in the flash memory rewriting operation, the output signal S15 of the AND gate 22 continues to set the value of the monitor timer 9. In contrast, when the CPU halting mode is released, the setting signal S3 sets the value of the monitor timer 9 at every predetermined interval.

As described above, according to the present embodiment 5, the monitor timer 9 is supplied with the output signal S15 of the AND gate 22, which is used as the switching control signal of the changeover switch 25, as the continuously setting signal. This offers an advantage of being able to prevent the monitor timer 9 from generating an interrupt to the CPU 3 and waiting mode controller 15 in the CPU halting mode.

EMBODIMENT 6

Figure 6:
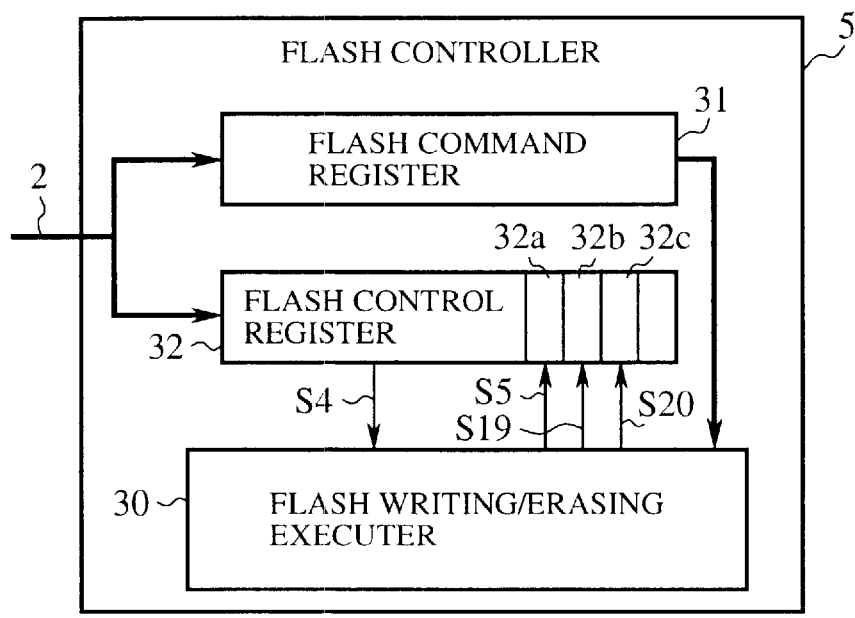
FIG. 6 is a block diagram showing an internal configuration of a flash controller in an embodiment 6 of the microcomputer with a built-in flash memory in accordance with the present invention.

Next, an embodiment 6 in accordance with the present invention will be described. FIG. 6 is a block diagram showing an internal configuration of the flash controller 5 in the embodiment 6 of the microcomputer with a built-in flash memory in accordance with the present invention. In this figure, components corresponding to those of the embodiment 1 are designated by the same reference numerals as those of FIG. 7, and the description thereof is omitted here.

In FIG. 6, the reference numeral 32b designates a particular bit of the flash control register 32 for holding a test resultant signal S19 indicating a normal/abnormal completion at the end of the automatic writing of the flash memory 4. The reference numeral 32c designates a particular bit of the flash control register 32 for holding a test resultant signal S20 indicating a normal/abnormal completion at the end of the automatic erasing of the flash memory 4. The flash controller 5 of the present embodiment 6 differs from the flash controller 5 as shown in FIG. 7 in connection with the embodiment 1 and the conventional microcomputer with a built-in flash memory in that the flash control register 32 includes the particular bits 32b and 32c for holding the test resultant signals S19 and S20.

Next, the operation of the present embodiment 6 will be described.

Since the basic operation of the present embodiment 6 is the same as that of the embodiment 1, only different portions will be described here. The flash writing/erasing executer 30 stores the test resultant signal S19 into the particular bit 32b of the flash control register 32 such that it is "0" when the writing completes correctly at the end of the automatic writing of the flash memory 4, and "1" when the writing completes abnormally. Likewise, the flash writing/erasing executer 30 stores the test resultant signal S20 into the particular bit 32c of the flash control register 32 such that it is "0" when the erasing completes correctly at the end of the automatic erasing of the flash memory 4, and "1" when the erasing completes abnormally.

The flash control register 32 is readable by the CPU 3, which reads its contents at the end of the automatic writing/erasing. As a result, the CPU 3 can assure that the automatic writing completes normally when the particular bit 32b is "0", and that it completes abnormally when it is "1". Likewise, the CPU 3 can assure that the automatic erasing completes normally when the particular bit 32c is "0", and that it completes abnormally when it is "1".

As described above, the present embodiment 6 offers an advantage that the CPU 3 can ensure the normal/abnormal completion of the automatic writing or erasing of the flash memory 4 by reading the flash control register 32 in the flash controller 5.

What is claimed is:

1. A microcomputer with a built-in flash memory comprising:
   a flash memory for electrically writing or erasing data;
   a CPU for issuing a writing/erasing command to said flash memory;
   a monitor timer for producing a time-up signal when said CPU does not set said monitor timer within a predetermined time period;
   a clock generator for generating a clock signal for operating said CPU;
   a first interrupt controller for generating a monitor interrupt to said CPU when said monitor timer outputs the time-up signal; a flash controller for controlling writing/erasing of said flash memory in accordance with the command from said CPU;
   a waiting mode controller for implementing a waiting mode in response to a CPU rewriting mode designating signal and a busy signal which are output from said flash controller during writing/erasing of said flash memory; and a gate circuit for halting supply of the clock signal from said clock generator to said CPU in the waiting mode in response to a control signal supplied from said waiting mode controller.

2. The microcomputer with a built-in flash memory according to claim 1, further comprising a particular bit for specifying whether to halt the supply of the clock signal to said CPU, wherein said waiting mode controller implements the waiting mode in response to a value of said particular bit, the CPU rewriting mode designating signal and the busy signal.

3. The microcomputer with a built-in flash memory according to claim 2, further comprising:

a one-shot pulse generator for generating a one-shot pulse in response to a change of the busy signal output from said flash. controller at an end of writing/erasing of said flash memory; and a second interrupt controller for generating an interrupt signal for releasing the waiting mode in response to the one-shot pulse from said one-shot pulse generator, and for causing an interrupt to said waiting mode controller using the interrupt signal.

4. The microcomputer with a built-in flash memory according to claim 3, further comprising:

a changeover switch for switching between the one-shot pulse fed from said one-shot pulse generator and the time-up signal fed from said monitor timer, wherein said first interrupt controller and said second interrupt controller consist of a single common interrupt controller, and wherein said changeover switch supplies its output signal to said common interrupt controller.

5. The microcomputer with a built-in flash memory according to claim 3, further comprising a logical circuit for generating, from the value of said particular bit and the CPU rewriting mode designating signal, a continuously setting signal that continuously sets said monitor timer when a CPU halting mode is selected in flash memory rewriting operation, and supplies the continuously setting signal to said monitor timer.

6. The microcomputer with a built-in flash memory according to claim 3, wherein said flash controller comprises a CPU readable flash control register including a particular bit for holding, at an end of writing/erasing of said flash memory, a test resultant signal indicating whether writing/erasing of said flash memory completes normally or abnormally.

7. The microcomputer with a built-in flash memory according to claim 2, further comprising a logical circuit for generating, from the value of said particular bit and the CPU rewriting mode designating signal, a continuously setting signal that continuously sets said monitor timer when a CPU halting mode is selected in flash memory rewriting operation, and supplies the continuously setting signal to said monitor timer.

8. The microcomputer with a built-in flash memory according to claim 2, wherein said flash controller comprises a CPU readable flash control register including a particular bit for holding, at an end of writing/erasing of said flash memory, a test resultant signal indicating whether writing/erasing of said flash memory completes normally or abnormally.

9. The microcomputer with a built-in flash memory according to claim 1, wherein said flash controller comprises a CPU readable flash control register including a particular bit for holding, at an end of writing/erasing of said flash memory, a test resultant signal indicating whether writing/erasing of said flash memory completes normally or abnormally.

10. The microcomputer with a built-in flash memory according to claim 1, further comprising:

a one-shot pulse generator for generating a one-shot pulse in response to a change of the busy signal output from said flash controller at an end of writing/erasing of said flash memory; and a second interrupt controller for generating an interrupt signal for releasing the waiting mode in response to the one-shot pulse from said one-shot pulse generator, and for causing an interrupt to said waiting mode controller using the interrupt signal.

* * * * *